3,235,464
LIQUID MODERATED NUCLEAR REACTOR CORE INCLUDING ANNULAR CONTROL ELEMENT MOVABLE ABOUT MODERATOR FILLER ROD
David John Ashcroft, Horwich, Bolton, England, assignor to United Kingdom Atomic Energy Authority, London, England
Filed Aug. 12, 1963, Ser. No. 301,430
Claims priority, application Great Britain, Aug. 30, 1962, 33,301/62
3 Claims. (Cl. 176—36)

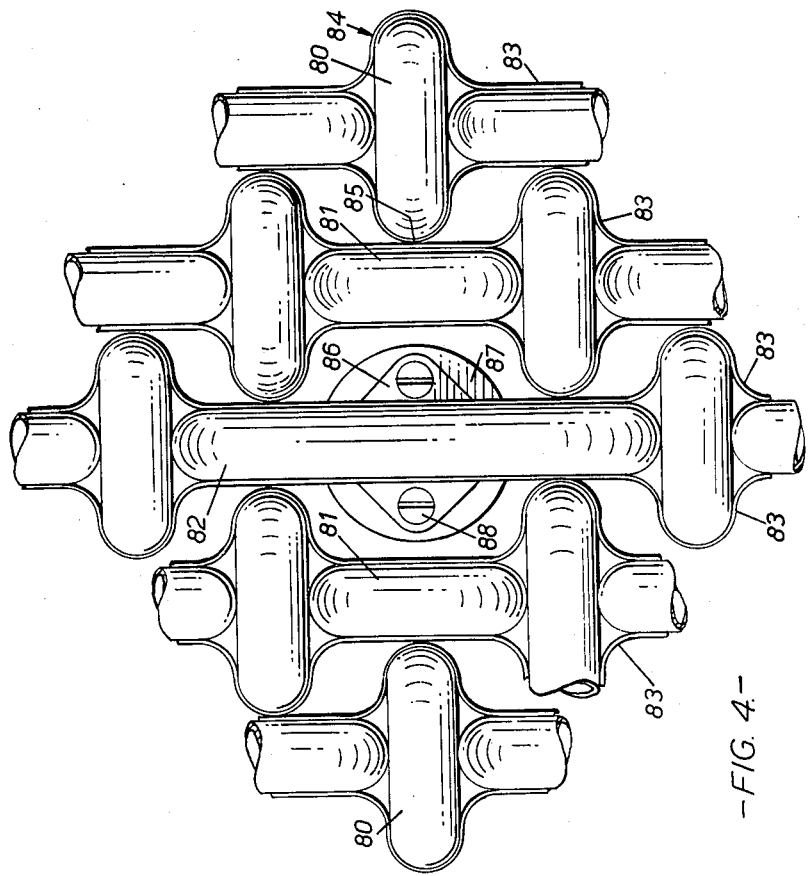
-FIG. 4-

This invention relates to nuclear reactors.

In a nuclear reactor means are provided to control the reactivity of the reactor. These means frequently comprise reactivity control elements of neutron absorbing material which are lowered into and raised out of the reactor core. These control elements may be allocated one of several functions, for example operational control in which the elements are employed to control the power level of the reactor, long term control in which the elements are employed to compensate for changes in core reactivity as fuel in a reactor is burnt-up, and emergency control in which elements (often referred to as shut-off elements) are introduced automatically into a reactor core in the event of a fault in the reactor system.

In a water-moderated reactor in which neutron moderation is provided by water circulating through a core containing fuel elements, it has been proposed that the control elements should displace moderating water in their movement into the core and that they should be in the form of flat blades or be of cruciform section so as to reduce the amount of water they displace. Furthermore, it has been suggested that in a water-moderated reactor the control elements should be tubular and open-ended so that when in position in the core the control rods are filled with water.

The present invention provides, in one of its aspects, a liquid-moderated nuclear reactor, for example, a water-moderated reactor, having a hollow, open-ended, neutron-absorbing control element which displaces liquid moderator in its movement into the core wherein a filler element is so positioned within the liquid moderator that it is surrounded by the control element when the control element is located within the core, the filler element being without fissile content and substantially of a moderator material which has a neutron slowing-down power less than that of the liquid moderator displaced by the filler element. Preferably the filler element comprises a rod of graphite clad in a metallic sheath. Alternatively, the filler material could be heavy water in the case of a light water liquid moderator.

When the control element is withdrawn from the reactor core the neutron flux in the region does not show the flux peaking which would occur in this region were it occupied solely by the displaced neutron moderating liquid.

One construction of nuclear reactor embodying the invention will now be described by way of example with reference to the accompanying drawings in which:

FIGURES 3 and 4 are enlarged diagrammatic views of the part of the reactor core.

Figure 1:
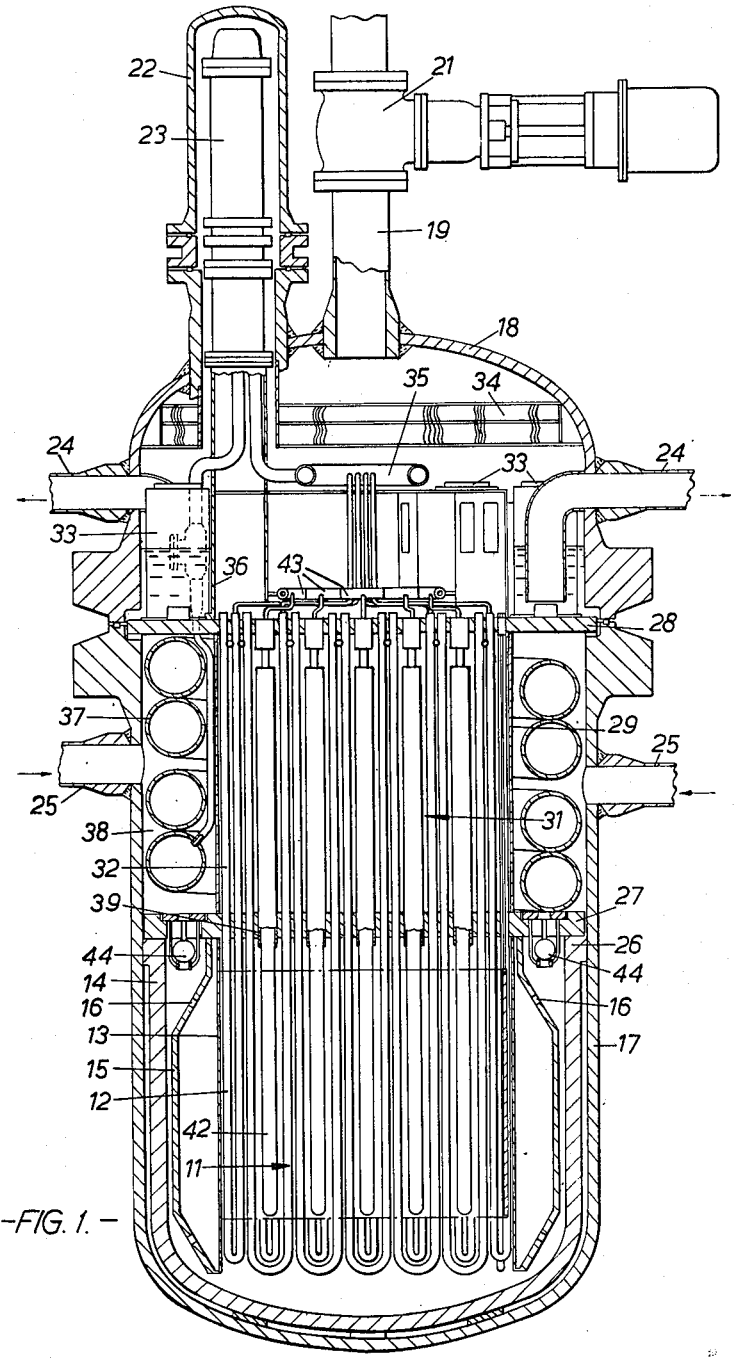
FIGURE 1 is a sectional view of a boiling water reactor.
Figure 2:
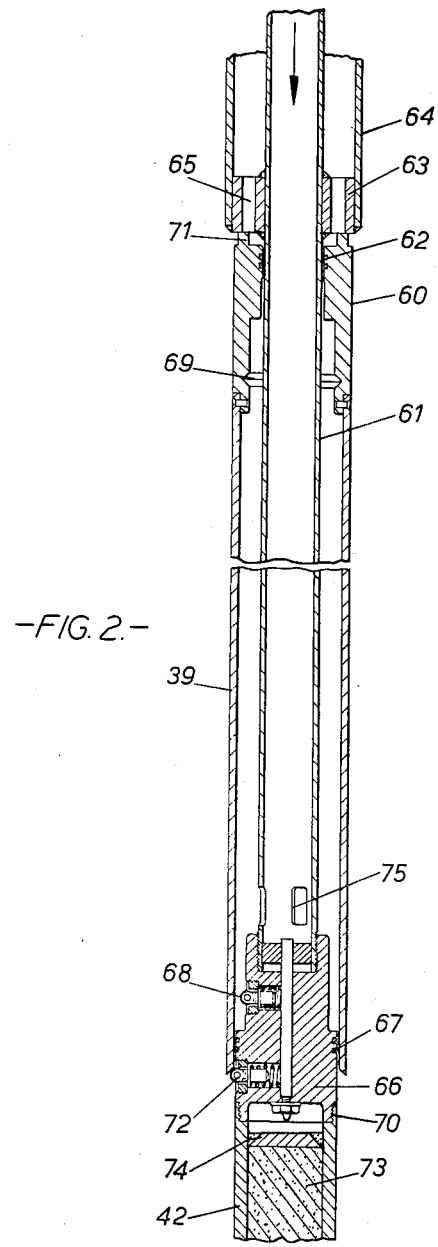
FIGURE 2 is an enlarged sectional view of a control element provided for the reactor.

The reactor now to be described by way of example has a core 11 (FIGURE 1) in which fuel elements are housed in fuel tubes 12 through which pressurised light water is circulated as a primary coolant. The fuel tubes are clustered in a manner to be described hereinafter in a region defined by a baffle 13, this assembly being housed in a pot 14. A secondary coolant, also light water, is circulated downwards through the annular space between the pot and the baffle and upwardly through the core between the fuel tubes. A thermal shield 15, interposed between the baffle and the pot, has apertures 16 to permit downward flow of the secondary coolant. Neutron moderation in the reactor is effected by the primary and secondary coolants.

The reactor is housed in a reactor vessel 17 closed by a dome 18 from which projects a steam pipe 19 fitted with a main steam isolating valve 21 and three casings 22 (of which only one is shown in FIGURE 1) each housing a motor-driven pump 23 for circulating the primary coolant. Also projecting laterally of the dome are four outlets 24 for recirculating unevaporated secondary coolant, whilst projecting laterally of the vessel 17 are four inlets 25 for the recirculating secondary coolant. The pot sits within the lower half of the reactor vessel, being located by a rim 26 surrounding the pot. An intermediate support plate 27 rests on the rim, whilst a top support plate 28 rests on a shoulder formed at the upper end of the vessel. These support plates traverse the reactor vessel. Between the support plates a skirt 29 defines a cylindrical heat transfer region 31 within which are clustered extension tubes 32, each extension tube being a continuation of a fuel tube. The upper ends of the extension tubes and the lower ends of the fuel tubes are interconnected to form ten parallel paths of serpentine configuration for the primary coolant. The fuel tubes and the extension tubes are suspended from the top support plate and are steadied against vibration and deformation by the intermediate support plate.

Apertures in the support plates permit upward flow of the secondary coolant through the core and heat transfer region into the dome. In its upward passage the secondary coolant is allowed to boil to form a mixture of steam and water which is separated in the dome by cyclone steam separators 33 carried by the top support plate which discharge water to the outlets 24 and steam to scrubber units 34 and thence to the steam outlet.

The primary coolant is collected from the ten paths through the fuel and extension tubes at an outlet ring header 35. Pumps 23 mounted on hollow stools 36 standing on the top support plate circulate the primary coolant from the outlet header 35 to a helical toroid pressuriser 37 and thence back to the fuel and extension tubes. The pressuriser serves to maintain the pressure of the primary coolant and is situated within the annular space 38 between the skirt and the reactor vessel.

Reactivity control elements in the form of hollow open-ended rods 39 of neutron absorbing material are housed within the heat transfer region when withdrawn from the core and are insertable into the core over fingers 42. The control rods are hydraulically operated, there being a connection between each rod and individual headers 43 so that the rods can be operated independently of each other. Alternatively there may be headers each common to a group of rods so that the rods are operable in groups.

The recirculated water of the secondary coolant, together with feed water as necessary, is returned to the reactor vessel by the inlets 25 which open into the annular space 38 above the intermediate support plate, the secondary coolant then passing through non-return valves, such as 44 to enter the core pot.

Twenty one control rods 39 distributed through the core are constituted by open-ended cylinders of stainless steel alloyed with 4% boron. Each cylinder is closed by a head 60 at its upper end which is slidable on a central fixed piston rod 61, sealing rings carried by the head ensuring a fluid-tight seal between the head and the piston rod. The piston rod is of stainless steel, is hollow, and is suspended from a web 63 at the lower end of a support shaft 64 itself suspended from the top core support plate 28. Apertures 65 through each web 63 admit secondary coolant into the space above the head 60 so that the pressure above and surrounding the head is equivalent to the pressure of the secondary coolant in the heat transfer region, namely coolant at core outlet pressure.

The piston rod extends downwardly through the heat transfer region but not into the core region. A fixed piston 66 is screwed onto the lower end of the piston rod, the piston carrying circumferential rings 67 which make a fluid-tight, sliding seal with the interior of the lower end of the cylindrical control rod. The control rod can slide downwardly over the piston 66 until the head 60 carried by the rod engages the piston. In this lowermost position of the control rod, three ball-headed latches 68 (of which one is shown) carried in equispaced angular relationship by the piston engage notches 69 in the head 60. The control rod can be raised until a projecting ring 71 on the head 60 engages the web 63. In this uppermost position of the control rod, three ball-headed latches 72 (of which one is shown) carried by the piston engage under the lower, chamfered edge of the control rod. The lowermost position of the control rods corresponds to a state in which the reactivity of the reactor is most reduced since the rods of neutron absorbing material are then positioned in the core region. In their uppermost positions, the control rods are situated in the reactor heat transfer region (FIGURE 1) and, therefore, have little effect on the neutron flux in the core.

Figure 3:
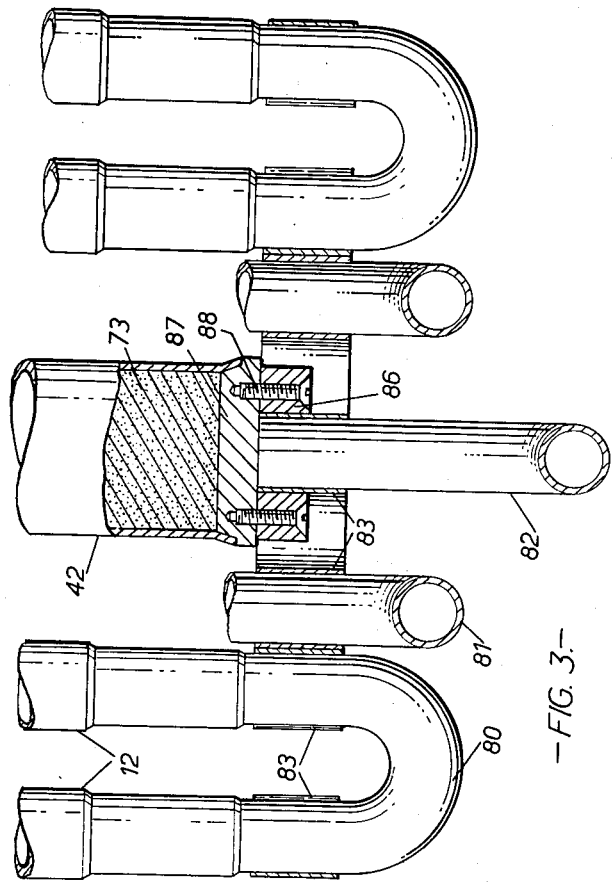

Each control rod 39 is positioned over a filler element 42 in the form of a hollow Zircaloy cylinder filled with graphite 73. The upper end of the filler is closed by a cap 74 and has a threaded locating rim 70 screwed over a similar threaded rim at the lower end of the piston 66 by which it is supported. At its lower end each filler is closed and is tied to the lower ends of the clustered fuel tubes 12 by means shown diagrammatically in FIGURES 3 and 4. In FIGURE 3 is shown a side view of the lower ends of a row of clustered fuel tubes 12 and a single control rod filler 42, the view being perpendicular to that of FIGURE 1. Four fuel tubes interconnected by U-bends 80 lying in the plane of the figure are shown in full; two fuel tubes with U-bends 81 perpendicular to the figure are broken away above the U-bends for simplicity. The U-bend 82 interconnecting two fuel tubes (not shown) across the lower end of the control rod filler describes a larger arc than the U-bends 80 and 81. The fuel tubes are located and retained in a spaced relationship by corrugated steel strips 83 which extend parallel to each other across the lower end of the core, the plane of the strips being vertical; eight such strips are shown in FIGURE 4 which is a view of the U-bends of FIGURE 3 as seen from below. As shown in FIGURE 4 the strips 83 have spaced corrugations 84 which co-operate so that the U-bends 80, 81 and 82 can be slid between them and retained therein by the resilience of the strip. In position each U-bend is retained against movement perpendicular to the plane of the U-bend, this being the direction in which the U-bends and their fuel tubes are most likely to deflect. To increase the rigidity of the mesh of steel strips, the strips are brazed together at points 85 of contact between a corrugation and an adjacent strip. The mesh of steel strips 83 is suspended from the control rod fillers 42 by means of pads 86 brazed to the steel strips at positions adjacent the larger U-bends 82. These pads 86 are secured to caps 87 closing the lower ends of the fillers 42 by set screws 88.

Each filler is located below a control rod so that as each control rod is introduced into the core it slides over the filler below it and, as a supplementary feature, is guided and steadied by the filler. When the control rods are raised out of the core, the fillers remain in the core. The fillers displace water by graphite which has a lower slowing-down power than water with the result that the neutron flux in the regions vacated by the control rods is substantially undistorted; this is in contrast to the flux peaking which would occur in the regions vacated by the control rods were these regions to be filled with water moderator.

The twenty one control rods 39 are all capable of independent movement. It is possible therefore to employ some of the control rods as shut off rods by raising them out of the reactor core during normal operation of the reactor and holding them in readiness for automatic introduction into the core should a fault occur in the reactor system, whilst yet other of the control rods may be employed for long term reactivity control by retaining them in the reactor core during initial operation of the reactor and raising them out of the core at a later stage of the reactor operation to compensate for reactivity loss, for example due to burn up of fuel in the core. The control rods of this reactor have only two stable positions namely their uppermost and lowermost positions. Accordingly the control rods cannot be employed for operational control of the reactor now described; operational control of this reactor is effected by varying the steam content and therefore the moderating power of the secondary coolant.

Movement of each control rod is effected hydraulically by means of secondary coolant water introduced into the control rod through the hollow piston rod 61. At its lower end the piston rod has apertures 75 to admit the water within the piston rod into the control rod. The piston rod of each control rod is extended upwards into direct communication with its header 43 and it is by regulating the fluid pressure within these headers that the control rods are moved. During normal operation of the reactor those control rods which are designated as shut off rods are in their uppermost positions with their headers placed in communication with the outlet from the secondary circulation pumps. Accordingly the interiors of the shut off rods are filled with secondary coolant water at a pressure equivalent to the pressure of water at the inlet to the core, whilst the rods and their heads 60 are surrounded by water in the heat transfer region at core outlet pressure. The cylindrical control rods are subject, therefore, to a pressure differential which is equivalent to the pressure drop across the core, and which is sufficient to retain the shut off rods in their uppermost positions. If this pressure drop falls, for example owing to failure of the secondary coolant pumps, excess pressure above the shut off rods inserts them into the core automatically. However, the latches 72 prevent movement of the shut off rods in response to only minor variations in the pressure drop.

During normal operation of the reactor those control rods which are employed for long term reactivity control are retained, at least for a time, within the core by placing their headers in communication with secondary coolant water at core outlet pressure, thus equalising the pressures on either side of the control rod heads 60. When it is desired to raise any of these control rods their headers are placed in communication with the secondary coolant pump outlets and the rods are thereby raised to their uppermost positions and then operate as the shut off rods described above.

When the reactor is started up it is sometimes desirable to withdraw the control rods from the core before the secondary coolant flow has reached its operational level and, therefore, before the pressure differential across the control rods is sufficient to raise them. Accordingly, the reactor is provided with a reservoir of water at high pressure which can be placed in communication with the control rod headers thereby increasing the pressure drop across the control rods sufficiently to raise them. Similarly a reservoir of water at low pressure is provided which can be placed in communication with the control rod headers thereby decreasing the pressure drop across the control rods and effecting a rapid insertion of the control rods.

It is to be understood that this invention is not limited to the details of the foregoing example; for instance, it is envisaged that spring means may be provided to assist insertion of the control rods. Such spring means would comprise a coil spring surrounding the control rod and acting between the fixed support shaft 64 and a shoulder provided at the lower end of the control rod. This spring would be in compression when the control rod was raised to its uppermost position and would tend to restore the rod to its lowermost position against the hydraulic action of the coolant water.

I claim:

1. A liquid-moderated nuclear reactor comprising a core of nuclear fuel elements immersed in liquid moderator, a hollow open-ended neutron-absorbing control element which is movable into the core thereby displacing liquid moderator, and a filler element displacing liquid moderator in the core and so positioned that it is surrounded by the control element when the control element is located in the core, the filler element being devoid of fissile content and substantially of a moderator material which has a neutron slowing-down power less than that of the liquid moderator displaced by the filter element.

2. A liquid-moderated nuclear reactor comprising a core of nuclear fuel elements immersed in liquid moderator, a hollow open-ended neutron-absorbing control element which is movable into the core thereby displacing liquid moderator, and a graphite filler element displacing liquid moderator in the core which is so positioned that it is surrounded by the control element when the control element is located in the core.

3. A liquid-moderated nuclear reactor comprising a core of nuclear fuel elements immersed in liquid moderator, a cylindrical open-ended neutron-absorbing control element which is movable into the core thereby displacing liquid moderator, a fixed piston within the control element with respect to which the control element is slidable, and a graphite filler element supported by the fixed piston to displace liquid moderator in the core.

References Cited by the Examiner
UNITED STATES PATENTS

| 2,852,458 | 9/1958 | Dietrich | 176—86 |
| 2,961,393 | 11/1960 | Monson | 176—86 |

OTHER REFERENCES

Benzler et al.: German appl. 1,049,014, printed Jan. 22, 1959 (3 pp. spec.; 1 sht. dwg.).

CARL D. QUARFORTH, *Primary Examiner.*

REUBEN EPSTEIN, *Examiner.*